(12) United States Patent
Chen et al.

(10) Patent No.: US 10,518,172 B2
(45) Date of Patent: Dec. 31, 2019

(54) ACCESSORY MANAGEMENT OF VIRTUAL REALITY SYSTEM

(71) Applicant: HTC Corporation, Taoyuan (TW)

(72) Inventors: Chia-Wei Chen, Taoyuan (TW); Lo-Chien Lee, Taoyuan (TW); Kai-Hsiu Chen, Taoyuan (TW)

(73) Assignee: HTC Corporation, Taoyuan (TW)

( * ) Notice: Subject to any disclaimer, the term of this patent is extended or adjusted under 35 U.S.C. 154(b) by 353 days.

(21) Appl. No.: 15/423,603

(22) Filed: Feb. 3, 2017

(65) Prior Publication Data

US 2017/0252643 A1 Sep. 7, 2017

Related U.S. Application Data

(60) Provisional application No. 62/304,327, filed on Mar. 7, 2016.

(51) Int. Cl.
*A63F 13/235* (2014.01)
*A63F 13/212* (2014.01)
(Continued)

(52) U.S. Cl.
CPC .......... *A63F 13/235* (2014.09); *A63F 13/212* (2014.09); *A63F 13/22* (2014.09);
(Continued)

(58) Field of Classification Search
CPC ...... A63F 13/235; A63F 13/212; A63F 13/22; A63F 13/285; A63F 13/35; A63F 13/792;
(Continued)

(56) References Cited

U.S. PATENT DOCUMENTS 5,742,278 A * 4/1998 Chen ................. A63F 13/06
345/156
5,835,077 A * 11/1998 Dao ................... G01C 9/00
345/157

(Continued)

FOREIGN PATENT DOCUMENTS

JP 2003053025 A 2/2003
JP 2008021117 A 1/2008
(Continued)

OTHER PUBLICATIONS

Corresponding Japan office action dated Mar. 27, 2018.
Xorresponding extended European Search Report dated Aug. 4, 2017.

*Primary Examiner* — David L Lewis
*Assistant Examiner* — Matthew D Hoel
(74) *Attorney, Agent, or Firm* — CKC & Partners Co., LLC (57) ABSTRACT

A virtual reality system includes a head-mounted display and a processing device. The head-mounted display is configured for displaying a virtual reality content. The processing device is coupled to the head-mounted display device and communicated with an accessory kit. The processing device is configured to collect descriptor information from the accessory kit, obtain an accessory type identification of the accessory kit from the descriptor information, and process input-output data of the accessory kit according to the accessory type identification. The input-output data corresponds to interaction between at least one virtual reality object in the virtual reality content and the accessory kit.

20 Claims, 8 Drawing Sheets

(51) Int. Cl.
*A63F 13/22* (2014.01)
*A63F 13/285* (2014.01)
*A63F 13/35* (2014.01)
*A63F 13/792* (2014.01)
*A63F 13/98* (2014.01)
*G06F 3/01* (2006.01)

(52) U.S. Cl.
CPC ............. *A63F 13/98* (2014.09); *G06F 3/016* (2013.01); *A63F 13/285* (2014.09); *A63F 13/35* (2014.09); *A63F 13/792* (2014.09)

(58) Field of Classification Search
CPC .......... A63F 13/98; A63F 13/00; G06F 3/011; G06F 3/012; G06F 3/016; G06F 3/0346
See application file for complete search history.

(56) References Cited

U.S. PATENT DOCUMENTS

| | | | | |
|---|---|---|---|---|
| 5,961,898 | A * | 10/1999 | Higashida | B29C 45/1753 264/328.1 |
| 6,005,551 | A * | 12/1999 | Osborne | G06F 3/016 345/161 |
| 6,159,100 | A * | 12/2000 | Smith | A63F 13/10 434/55 |
| 6,162,123 | A | 12/2000 | Woolston | |
| 6,262,712 | B1 * | 7/2001 | Osborne | A63F 13/06 345/156 |
| 6,569,011 | B1 * | 5/2003 | Lynch | A63F 13/12 434/16 |
| 6,902,482 | B1 * | 6/2005 | Woolston | A63F 13/10 273/148 B |
| 7,274,097 | B2 * | 9/2007 | Baek | H01L 23/3114 257/686 |
| 7,405,726 | B2 * | 7/2008 | Pelosi | G01S 3/784 345/158 |
| 7,871,330 | B2 * | 1/2011 | Woolston | A63F 13/10 273/148 B |
| 7,919,945 | B2 * | 4/2011 | Houston | A63F 13/06 310/14 |
| 2001/0020937 | A1 * | 9/2001 | Rosenberg | G01B 5/008 345/184 |
| 2001/0031662 | A1 * | 10/2001 | Larian | A63F 9/24 463/36 |
| 2002/0103025 | A1 * | 8/2002 | Murzanski | A63F 13/06 463/37 |
| 2003/0030619 | A1 * | 2/2003 | Martin | G06F 3/011 345/156 |
| 2003/0063115 | A1 * | 4/2003 | Kaku | G06F 3/0421 715/711 |
| 2005/0017454 | A1 * | 1/2005 | Endo | G06F 3/016 273/317.1 |
| 2005/0026703 | A1 * | 2/2005 | Fukawa | A63F 13/04 463/51 |
| 2005/0085298 | A1 * | 4/2005 | Woolston | A63F 13/10 463/37 |
| 2005/0202870 | A1 * | 9/2005 | Kawamura | A63F 13/04 463/36 |
| 2005/0224582 | A1 * | 10/2005 | Aiki | A63F 13/04 235/472.01 |
| 2005/0272506 | A1 * | 12/2005 | Sumi | A63F 13/04 463/51 |
| 2007/0111779 | A1 * | 5/2007 | Osnato | A63F 13/06 463/16 |
| 2007/0265084 | A1 * | 11/2007 | Sato | A63F 13/06 463/37 |
| 2007/0270217 | A1 * | 11/2007 | Rabin | A63F 13/06 463/37 |
| 2008/0014834 | A1 * | 1/2008 | Woolston | A63F 13/10 446/473 |
| 2008/0064500 | A1 * | 3/2008 | Satsukawa | A63F 13/04 463/37 |
| 2008/0076567 | A1 * | 3/2008 | Dohta | A63F 13/10 463/37 |
| 2008/0113798 | A1 * | 5/2008 | Miyanaga | A63F 13/06 463/37 |
| 2009/0054144 | A1 * | 2/2009 | Peng | A63F 13/06 463/36 |
| 2009/0058850 | A1 | 3/2009 | Fun | |
| 2010/0173686 | A1 * | 7/2010 | Grant | A63F 13/06 463/2 |
| 2010/0182340 | A1 * | 7/2010 | Bachelder | G02B 27/017 345/633 |
| 2010/0261542 | A1 * | 10/2010 | Maglaque | A63B 69/3617 473/300 |
| 2011/0035684 | A1 * | 2/2011 | Lewis | A63F 13/10 715/753 |
| 2013/0316820 | A1 * | 11/2013 | Douglas | A63F 13/00 463/31 |
| 2014/0302919 | A1 | 10/2014 | Ladd et al. | |
| 2014/0361956 | A1 | 12/2014 | Mikhailov et al. | |
| 2015/0182858 | A1 * | 7/2015 | Angelici | A63F 13/211 463/35 |
| 2015/0260474 | A1 * | 9/2015 | Rublowsky | F41A 33/00 434/16 |
| 2015/0279079 | A1 * | 10/2015 | Wieczorek | G02B 27/017 345/473 |

FOREIGN PATENT DOCUMENTS

| | | |
|---|---|---|
| JP | 2015502816 A | 1/2015 |
| JP | 2015104573 A | 6/2015 |
| WO | 2014140719 A1 | 9/2014 |

\* cited by examiner

ACCESSORY MANAGEMENT OF VIRTUAL REALITY SYSTEM

RELATED APPLICATIONS

This application claims priority to U.S. Provisional Application Ser. No. 62/304,327, filed Mar. 7, 2016, which is herein incorporated by reference.

BACKGROUND

Field of Invention

The present application relates to a virtual reality system. More particularly, the present application relates to a management of accessories in the virtual reality system.

Description of Related Art

In the current virtual reality (VR) environment, controller devices are commonly used to interact with VR scenes, such as game themes or VR contents. Usually, one virtual reality system is compatible with limited types of official accessories, such as controllers, sensors, touchpads or speakers. An accessory made by one manufacturer may not accepted by a virtual reality system made by another manufacturer. In other words, the virtual reality system has a poor compatibility to non-official accessories or $3^{rd}$ party accessories.

SUMMARY

The disclosure provides a virtual reality system compatible with an accessory kit. The virtual reality system includes a head-mounted display and a processing device. The head-mounted display is configured for displaying a virtual reality content. The processing device is coupled to the head-mounted display device and communicated with the accessory kit. The processing device is configured to collect descriptor information from the accessory kit, obtain an accessory type identification of the accessory kit from the descriptor information, and process input-output data of the accessory kit according to the accessory type identification. The input-output data corresponds to interaction between at least one virtual reality object in the virtual reality content and the accessory kit.

The disclosure provides a control method suitable for a virtual reality system including an accessory kit. The control method includes operations of: collecting descriptor information from the accessory kit; obtaining an accessory type identification of the accessory kit from the descriptor information; and, processing input-output data of the accessory kit according to the accessory type identification. The input-output data corresponds to data transmission between the accessory kit and at least one virtual reality object provided by the virtual reality system.

The disclosure provides a non-transitory computer readable storage medium with a computer program to execute aforesaid control method.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

Figure 1:
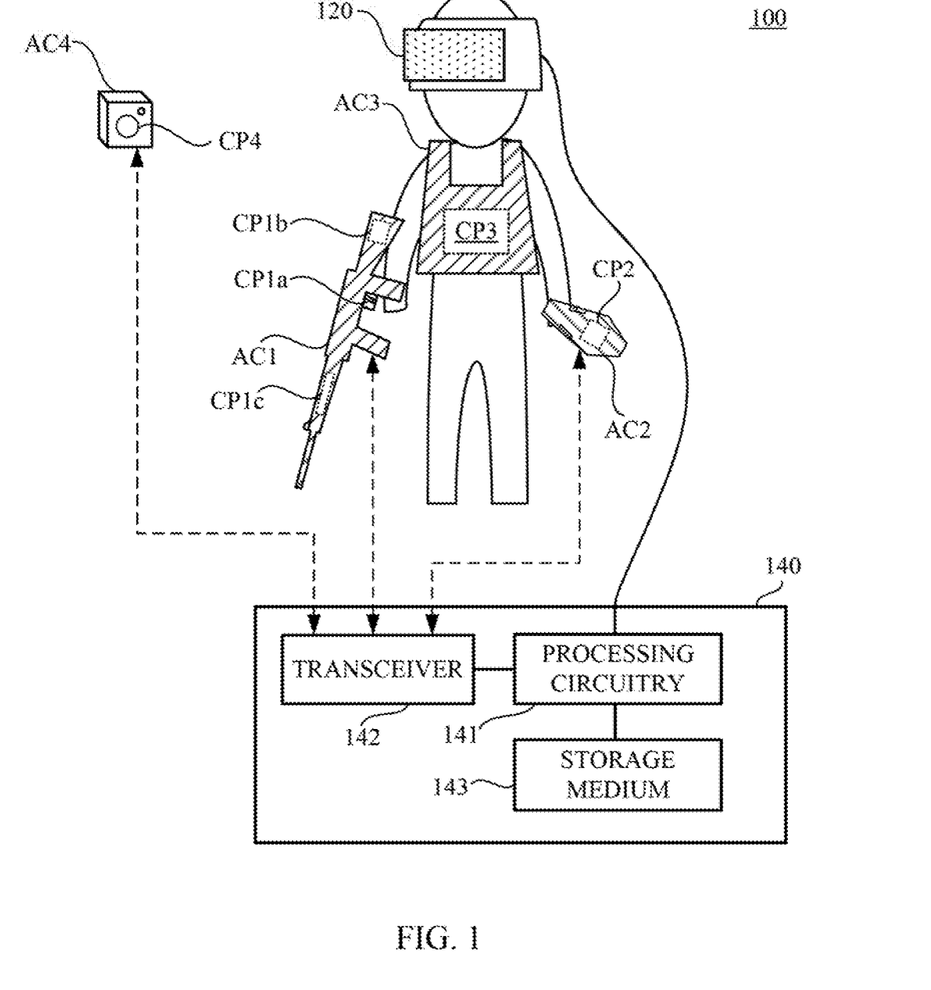
FIG. 1 is a schematic diagram illustrating a virtual reality system according to an embodiment of this disclosure.

Reference is made to FIG. 1, which is a schematic diagram illustrating a virtual reality (VR) system 100 according to an embodiment of this disclosure. As shown in FIG. 1, the virtual reality system 100 includes a head-mount display (HMD) 120 and a processing device 140. The head-mount display 120 can be disposed on a VR headset, which is wearable on a user. When a user wears the VR headset, the head-mount display 120 will cover visions of the user, and the head-mount display 120 is configured for displaying a virtual reality content to the user.

The processing device 140 is coupled to the head-mount display 120. The processing device 140 is a host device of the virtual reality system 100. In some embodiments, the processing device 140 can be implemented by a computer, a VR server, a smartphone, a gaming console or any device capable of controlling and driving the head-mount display 120. As shown in FIG. 1, the processing device 140 is implemented as a stand-alone computer, but the disclosure is not limited thereto.

In another embodiment, the head-mount display 120 and the processing device 140 can be integrated on the VR headset together. In this case, the processing device 140 is a processor or a control circuit implemented on the VR headset.

In still another embodiment, the head-mount display 120 and the processing device 140 can be implemented by one smart phone. In this case, the smart phone includes a display panel as the head-mount display 120 and a processor as the processing device 140.

The processing device 140 includes a processing circuitry 141, a transceiver 142 and a storage medium 143. The processing circuitry 141 can be a processor, a central processing unit, a control circuit and/or a graphic processing unit. The processing circuitry 141 is utilized to compute display data of the virtual reality content to be displayed on the head-mount display 120. The transceiver 142 is capable of establishing a wired or a wireless communicative connection to other devices. The transceiver 142 can include a Bluetooth transceiver, a BLE transceiver, a WiFi-direct transceiver, an Ad-Hoc transceiver or any equivalent transceiver capable of establishing the wireless communicative connection. The storage medium 143 can include a hard drive, a read-only memory and/or a flash memory. In the embodiment shown in FIG. 1, the head-mount display 120 is coupled to the processing device 140 over a connection wiring, but the disclosure is not limited thereto. In another embodiment, the head-mount display 120 can be wirelessly communicated with the transceiver 142 of the processing device 140.

In the embodiment shown in FIG. 1, the virtual reality system 100 is compatible with different accessory kits AC1-AC4. Each of the accessory kits AC1-AC4 may have different functions and generate different input-output data related to the virtual reality system 100. For demonstrational purpose, the accessory kit AC1 shown in FIG. 1 is a rifle-shaped controller; the accessory kit AC2 shown in FIG. 1 is a joystick; the accessory kit AC3 shown in FIG. 1 is a vest; and the accessory kit AC4 shown in FIG. 1 is a depth camera.

Each of the accessory kits AC1-AC4 can be an official accessory kit developed by the manufacturer of the virtual reality system 100 or a non-official accessory kit developed by a 3rd party supplier. The processing device 140 is able to communicate with the accessory kits AC1-AC4 wirelessly through the transceiver 142. In the embodiment, the processing device 140 is able to recognize each of the accessory kits AC1-AC4 respectively and property process input-output data induced by the accessory kits AC1-AC4, such that the accessory kits AC1-AC4 may trigger or perform different functions (shooting, selecting, clicking, pointing, positioning, vibrating, etc) of the virtual reality system 100. Details about how to recognize accessory kits and process the input-output data are explained in following embodiments.

Figure 2:
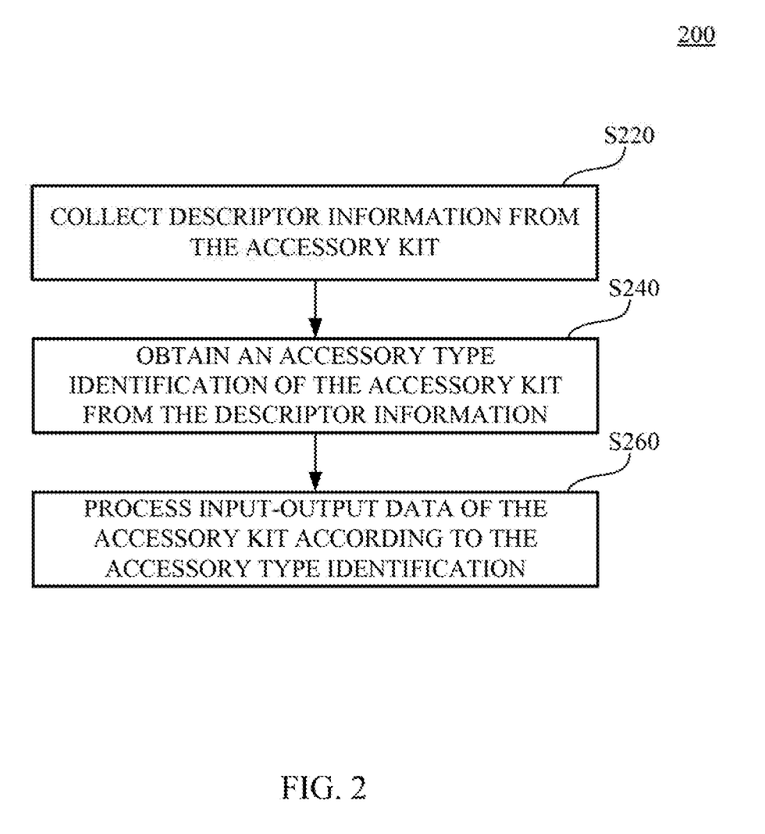
FIG. 2 is a flow chart illustrating a control method according to an embodiment of the disclosure.

Reference is also made to FIG. 2, which is a flow chart illustrating a control method 200 according to an embodiment of the disclosure. The control method 200 is suitable for the virtual reality system 100 shown in FIG. 1. Operation S220 of the control method 200 is performed by the processing device 140 to collect descriptor information from each of the accessory kits AC1-AC4 whichever connected to the processing device 140. Operation S240 of the control method 200 is performed by the processing device 140 to obtain an accessory type identification (ATID) from the descriptor information of each one of the accessory kits AC1-AC4. In one embodiment, the accessory type identification (ATID) is the descriptor information. In the following, we will take the accessory type identification (ATID) as examples for explanation.

In an embodiment, the descriptor information at least includes an accessory identification (AID) of each accessory kit AC1, AC2, AC3 or AC4. The accessory type identification can indicate functions or specifications of corresponding accessory kit AC1, AC2, AC3 or AC4. The accessory kits AC1-AC4 with different functions will have different accessory type identifications.

In an embodiment, the descriptor information of each accessory kit can further include a product identification (PID) and a vender identification (VID). The product identification (PID), the vender identification (VID) and the accessory type identification (ATID) can compose the unique accessory identification (AID) of each accessory kit. In another embodiment, the descriptor information of each accessory kit can include more or less data columns, not limited to include the product identification (PID), the vender identification (VID) and the accessory type identification (ATID). In an embodiment, the descriptor information can be transmitted in a standard packet format of Bluetooth protocol or BLE protocol from the accessory kits AC1-AC4 to the processing device 140.

Figure 3:
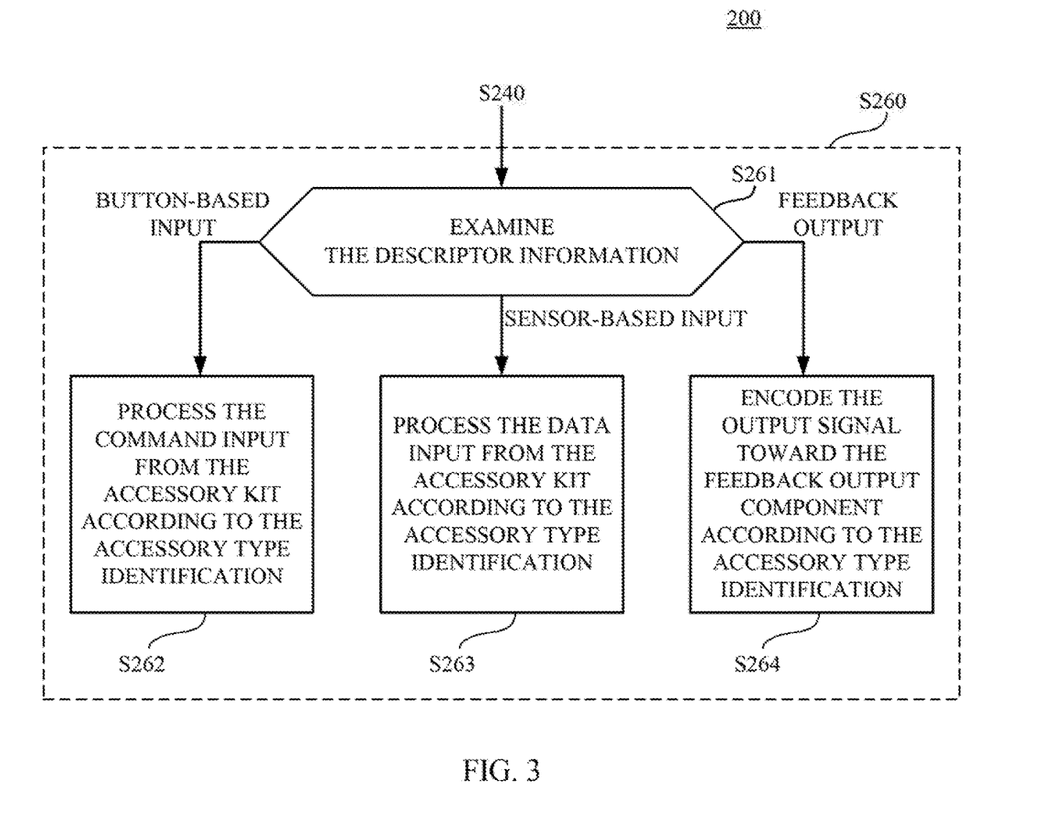
FIG. 3 is a flow chart illustrating further operations in an operation shown in FIG. 2 according to some examples.

Operation S260 of the control method 200 is performed by the processing device 140 to process input-output data of each of the accessory kits AC1-AC4 whichever connected to the processing device 140 according to the accessory type identifications of the accessory kits AC1-AC4. The input-output data corresponds to interaction between the accessory kits AC1-AC4 and at least one virtual reality object in the virtual reality content displayed by the head-mount display 120. For example, aforesaid virtual reality object can be a foreground item (e.g., a weapon, a vehicle, a controller, a furniture, or any virtual item), a background texture (e.g., surroundings, weather, luminance, or any virtual background configuration), a view angle, a view orientation, a display effect and/or a sound effect in the virtual reality content. In other words, the input-output data defines the interaction between the accessory kits AC1-AC4 and the virtual reality content (including items, configurations, visional effects and/or audio effects). Reference is further made to FIG. 3. FIG. 3 is a flow chart illustrating further operations S261-S264 in the operation S260 shown in FIG. 2 according to some examples.

As shown in FIG. 1, the accessory kit AC1 includes a button-based input component CP1a, which can be a shooting trigger of the rifle. The accessory kit AC2 includes a sensor-based input component CP2, which can be an inertial measurement unit (IMU) sensor (e.g., a gravity sensor, a gyro sensor or an accelerator sensor) disposed in the joystick. The accessory kit AC3 includes a feedback output component CP3, which can be a vibrator disposed in the vest. The accessory kit AC4 includes a sensor-based input component CP4, which can be an infrared depth sensor of the depth camera. The accessory type identifications of the accessory kits AC1-AC4 will indicate different characteristics between the button-based input component CP1a, the button-based input component CP2, the feedback output component CP3 and the sensor-based input component CP4. The processing device 140 can acknowledge the types of the accessory kit AC1, AC2, AC3 or AC4 currently pairing with the virtual reality system 100 according to the accessory type identifications.

As shown in FIG. 1 and FIG. 3, operation S261 is performed by the processing device 140 to examine the accessory type identification from each accessory kit. When the accessory type identification from the accessory kit AC1 indicates that the accessory kit AC1 includes the button-based input component CP1a, and in this case the input-output data includes a command input (e.g., fire the rifle in the virtual reality content) sensed by the button-based input component CP1a, operation S262 is performed by the processing device 140 to process the fire command input from the accessory kit AC1 according to the accessory type identification when the button-based input component CP1a is triggered (i.e., when the user pulls the shooting trigger on the accessory kit AC1). Based on the accessory type identification, the processing device 140 can acknowledge that the command input from the accessory kit AC1 is related to fire the rifle in the virtual reality content. The head-mounted display 120 is configured for displaying a virtual effect (e.g., a light caused by firing the rifle) corresponding to the command input or another virtual reality object (e.g., a bullet from the rifle) also corresponding to the command input in the virtual reality system.

When the accessory type identification from the accessory kit AC2 indicates that the accessory kit AC2 includes the sensor-based input component CP2, and in this case the input-output data includes a data input (e.g., a moving pattern sensed by the gravity sensor, the gyro sensor or the accelerator sensor) sensed by the sensor-based input component CP2, operation S263 is performed by the processing device 140 to process the data input related to the moving pattern from the accessory kit AC2 according to the accessory type identification. In this case, the data input sensed by the sensor-based input component CP2 will be retrieved or updated periodically, such as every 10 microseconds, every 50 microseconds, etc. Based on the accessory type identification, the processing device 140 can acknowledge that the data input from the accessory kit AC2 is related to the moving pattern. In response to the moving pattern sensed by the sensor-based input component CP2, a virtual object corresponding to the accessory kit AC2 holding in the left hand of the user in the virtual reality content may be moved according to the moving pattern.

Similarly, when the accessory type identification from the accessory kit AC4 indicates that the accessory kit AC4 includes the sensor-based input component CP4, and in this case the input-output data includes another data input (e.g., a depth map detected by the infrared depth sensor of the depth camera, and the depth map may show positions or orientations of the user and other objects in the space) sensed by the sensor-based input component CP4, operation S263 is performed by the processing device 140 to process the data input related to the depth map from the accessory kit AC4 according to the accessory type identification. In this case, the data input sensed by the sensor-based input component CP4 will be retrieved or updated periodically. In response to the depth map along with the positions or orientations analyzed from the depth map, the processing device 140 may render the virtual reality content in different visual angle or along different orientation accordingly, such that the user can observe different views of the virtual reality content when the user moves.

When the accessory type identification from the accessory kit AC3 indicates that the accessory kit AC3 includes the feedback output component CP3, and in this case the input-output data includes an output signal (e.g., a control signal to activate the vibrator in the vest) toward the feedback output component CP3, operation S264 is performed by the processing device 140 to encode the output signal toward the feedback output component CP3 according to the accessory type identification. In this case, the output signal will be generated when the virtual reality content needs it. For example, when the user got shot in the virtual reality content, the output signal will be generated accordingly. In response to the output signal, the feedback output component CP3 (i.e., the vibrator disposed in the vest) is configured for vibrating corresponding to the virtual reality content. The feedback output component is not limited to a vibrator. In another embodiment, the feedback output component can be a speaker or a light emitter, and the feedback output component will be utilized to broadcast a sound or illuminate a light in response to the output signal corresponding to the virtual reality content. In operation S264, the output signal is encoded in different formats (e.g., a PWM control signal for vibration, an audio signal or a PWM control signal for light emitting) suitable for the feedback output component.

Each of the accessory kit AC1-AC4 is not limited to include one input or output component. As shown in the accessory kit AC1 further includes a feedback output component CP1b (e.g., a vibrator disposed around a butt of the rifle) and another feedback output component CP1c (e.g., a speaker disposed around a barrel of the rifle). When the user pulls the trigger on the rifle, an output signal will be generated may be generated and encoded by the processing device 140. This output signal will be sent to trigger the feedback output component CP1b to vibrate, so as to simulate a recoil force of the rifle. In addition, when the user pulls the trigger on the rifle, another output signal will be generated may be generated and encoded by the processing device 140, and this output signal will be sent to drive the feedback output component CP1c to broadcast a shooting sound effect of the rifle. Based on aforesaid embodiments, the accessory type identification of the accessory kit AC1 will indicate that the accessory kit AC1 has a combination of the button-based input component CP1a, the feedback output component CP1b and the feedback output component CP1c. Corresponding operations S262 and S264 are performed to process the corresponding input-output data (including the fire command input, the vibration output signal and the audio output signal) of the accessory kit AC1.

It is noticed that the button-based input component, the sensor-based input component and the feedback output component are not limited to the examples demonstrated in FIG. 1 and aforesaid embodiments. For example, the button-based input component can also be a touch pad, a keyboard, a pull trigger, a throttle pad or a brake pad for racing games, key pads on an electronic guitar, etc. The sensor-based input component can also be a gesture sensor, a camera, a GPS positioning receiver, etc. The feedback output component can also be a 4D movie chair synchronized with the virtual reality system 100, VR gloves, a VR running platform, etc.

In an embodiment, both of the command input and the data input can be transmitted in the standard packet format of Bluetooth protocol or BLE protocol from the accessory kits AC1-AC4 to the processing device 140. The processing device 140 can recognize and process them differently according to their accessory type identifications. The output signal toward the feedback output component will be encoded by the processing device 140 to be compatible for different feedback output component on various types of accessory kits.

Figure 4:
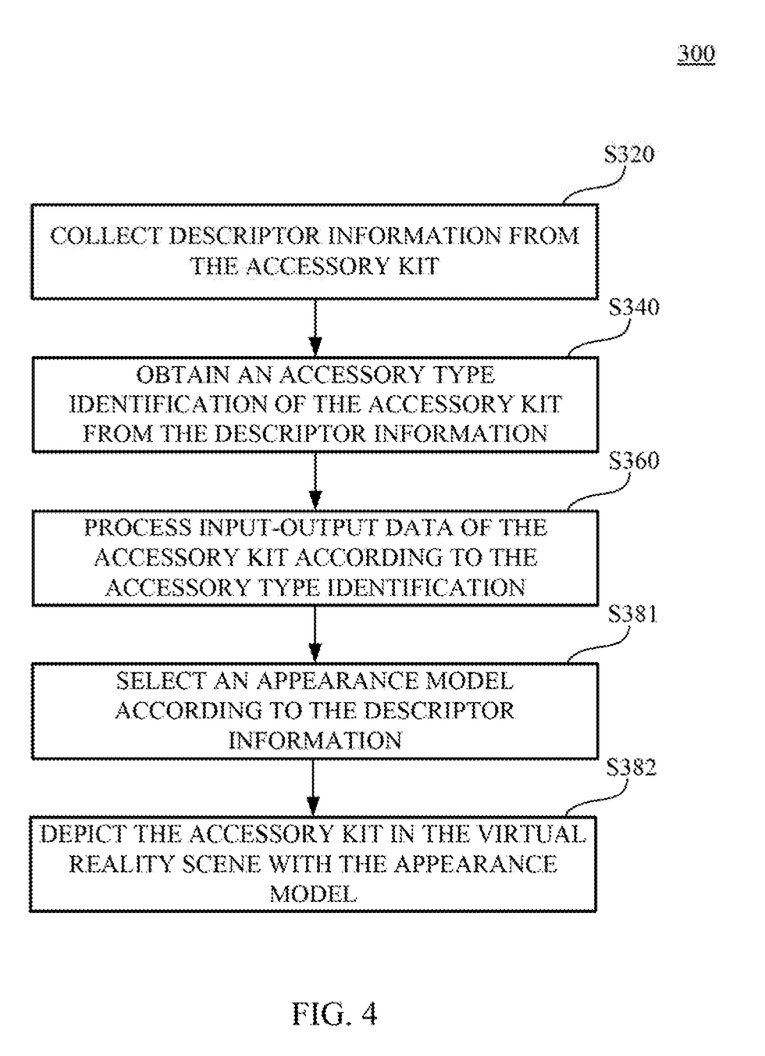
FIG. 4 is a flow chart illustrating a control method according to another embodiment.

Reference is further made to FIG. 4, which is a flow chart illustrating a control method 300 according to another embodiment. The control method 300 is suitable for the virtual reality system 100 in FIG. 1. Operations S320, S340 and S360 in the control method 300 can be referred to operations S220, S240 and S260 in FIG. 2 and FIG. 3, and not repeated here again.

Figure 5:
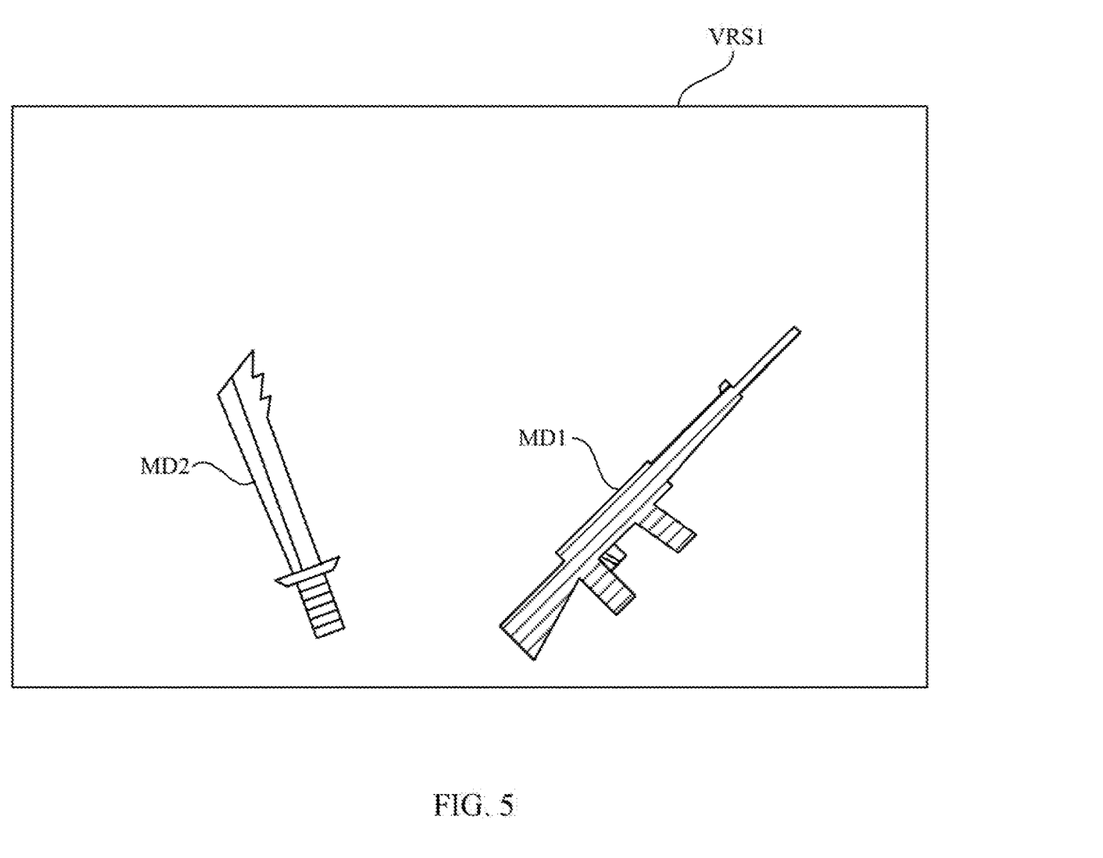
FIG. 5 is a schematic diagram illustrating a virtual reality content in an embodiment.

As shown in FIG. 1 and FIG. 4, operation S381 is performed by the processing device 140 to select an appearance model to represent a virtual reality object according to the descriptor information. In an embodiment, the descriptor information includes dimensional features and shape features of each accessory kit AC1, AC2, AC3 or AC4, and the appearance model is selected according to these dimensional features and shape features. Reference is made to FIG. 5, which is a schematic diagram illustrating a virtual reality content VRS1 in an embodiment. As shown in FIG. 5, the accessory kit AC1 hold by the user is shown in the virtual reality content VRS1 as the appearance model MD1. In this case, the appearance model MD1 is similar to the shape of the accessory kit AC1. The operation S382 is performed by the processing device 140 to depict the accessory kit AC1 in the virtual reality content VRS1 with the appearance model MD1.

Figure 6:
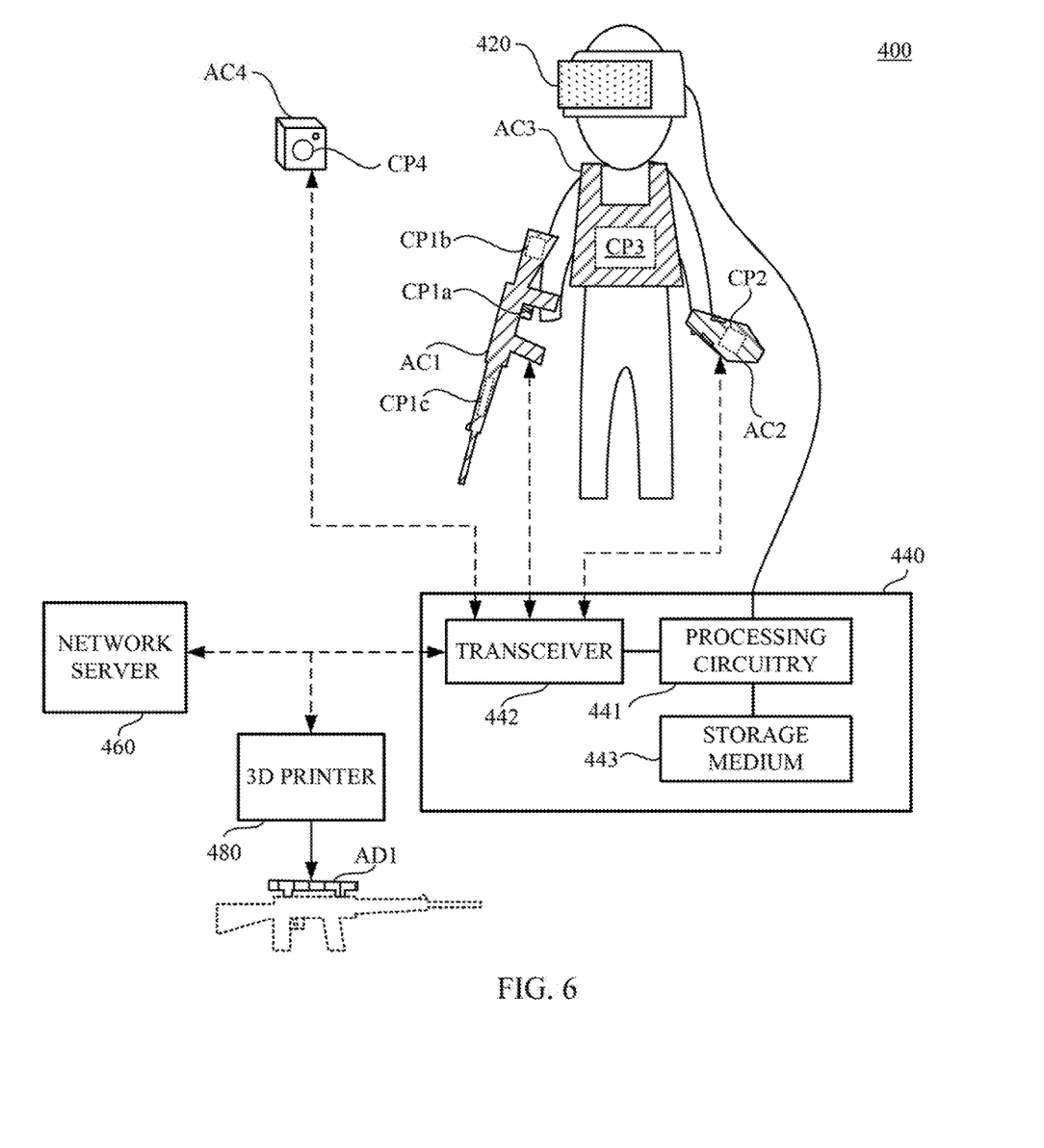
FIG. 6 is a schematic diagram illustrating a VR system according to another embodiment.

In another embodiment, the appearance model is selected according to the descriptor information from a built-in library stored in the storage medium 143 or the network server 460 in FIG. 6. For example, the appearance model is selected according to a look-up table between the different accessory identifications and different appearance models. As shown in FIG. 5, when the processing device 140 receives the accessory identification (AID) of the accessory kit AC2, the processing device 140 selects an appearance model MD2 corresponding to the accessory identification (AID). As shown in FIG. 5, the appearance model MD2 is not necessary similar to the original shape of the accessory kit AC2 (the joystick). In this case, the appearance model MD2 is in a blade shape. The appearance model MD2 can be defined by the virtual reality system 100 to match a gaming theme or other scenarios. The operation S382 is performed by the processing device 140 to depict the accessory kit AC2 in the virtual reality content VRS1 with the appearance model MD2. In this case, the accessory kit AC2 in real life can be transformed into the blade-shaped appearance model MD2 in the virtual reality content.

Figure 7:
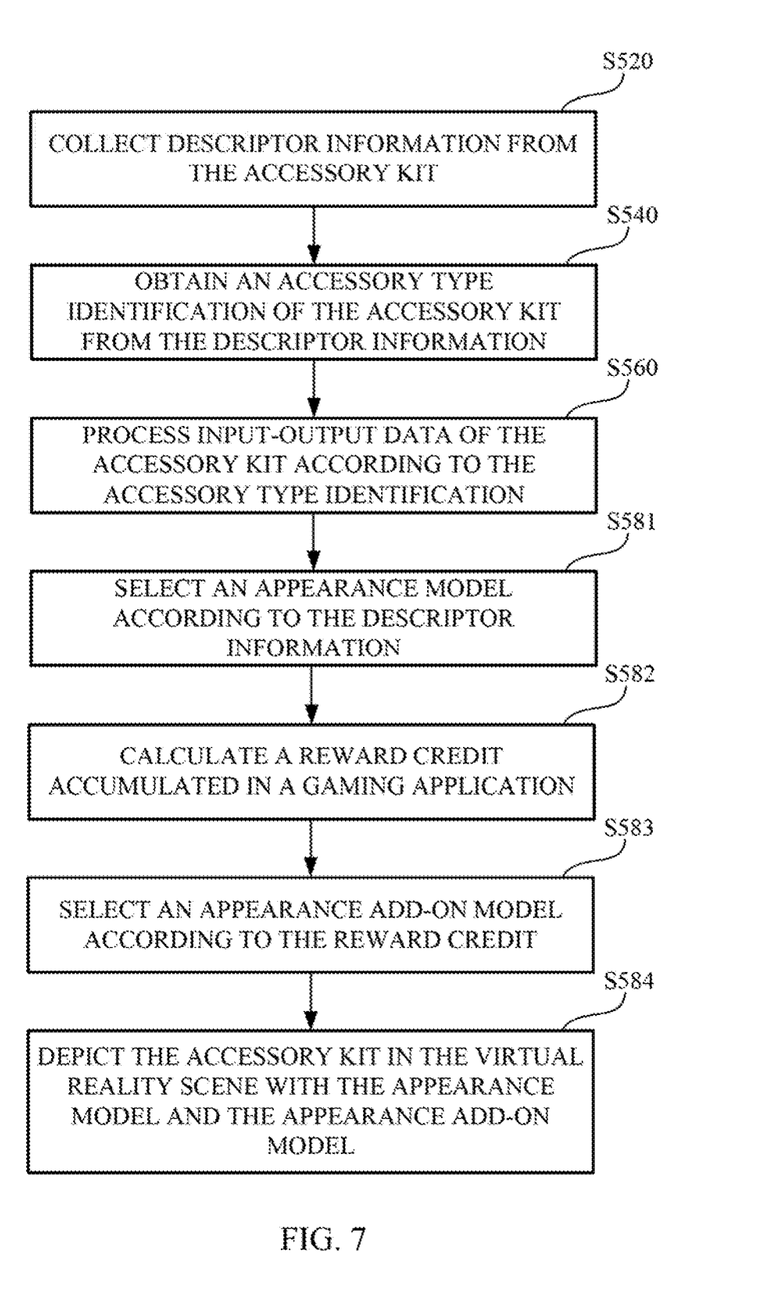
FIG. 7 is a flow chart illustrating a control method suitable for the VR system in FIG. 6.

Reference is further made to FIGS. 6 and 7. FIG. 6 is a schematic diagram illustrating a VR system 400 according to another embodiment. FIG. 7 is a flow chart illustrating a control method 500 suitable for the VR system 400 in FIG. 6. The VR system 400 includes a head-mount display (HMD) 420 and a processing device 440. The processing device 440 includes a processing circuitry 441, a transceiver 442 and a storage medium 443. The head-mount display 420 and the processing device 440 are similar to the head-mount display 120 and the processing device 140 in the embodiments in FIG. 1. Operations S520 to S560 are similar to operations S120 to 8160 in FIG. 2 and FIG. 3.

Figure 8:
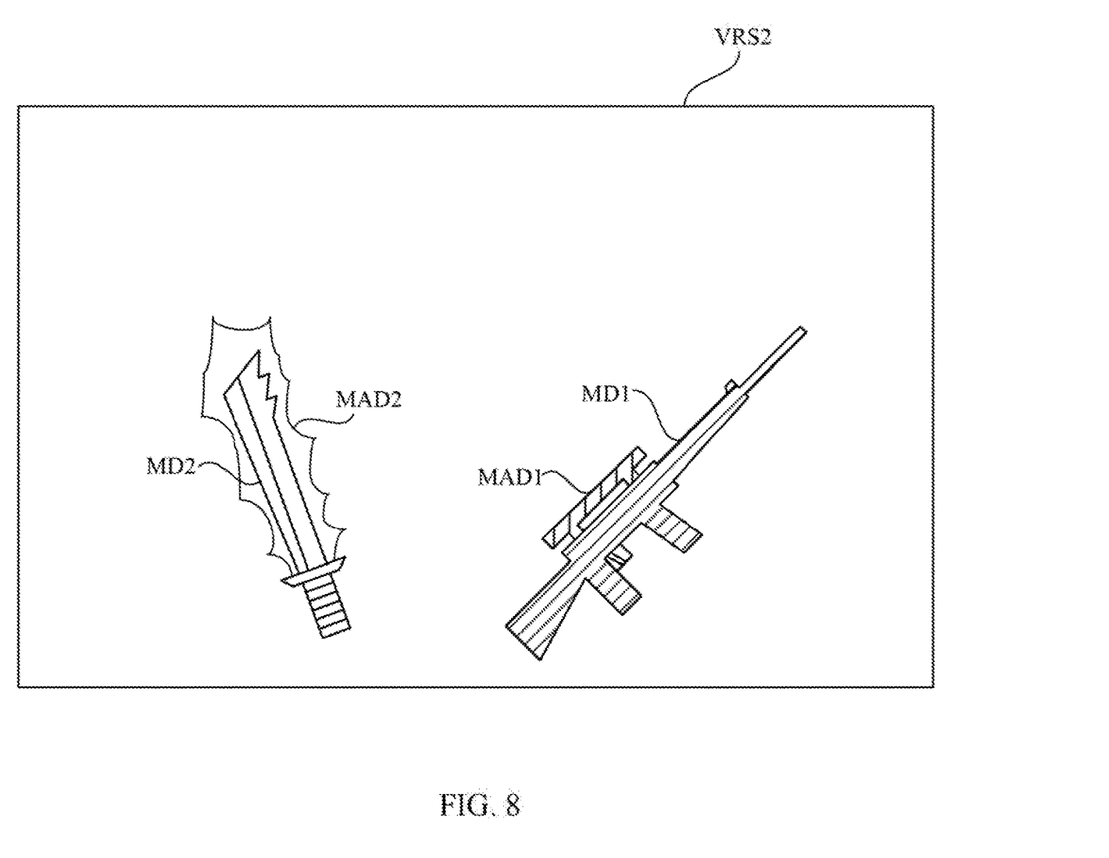
FIG. 8 is a schematic diagram illustrating a virtual reality content in an embodiment.

As shown in FIG. 6, the processing device 440 further communicates with a network server 460 and a 3D printer 480. As shown in FIG. 7, operation S581 is performed by the processing device 440 to select an appearance model according to the descriptor information. Operation S582 is performed by the processing device 440 to calculate a reward credit gained by the user and accumulated in a gaming application of the VR system 400. When the accumulated reward credit reaches a threshold value, the gaming application may upgrade or transform the weapon owned by the user in the virtual reality content. Operation S583 is performed by the processing device 440 to select an appearance add-on model from the network server 460 according to the reward credit owned by the user. Reference is also made to FIG. 8, which is a schematic diagram illustrating a virtual reality content VRS2 in an embodiment. In an example, when the user kills a certain amount of monsters in the gaming application, the rifle owned by the user is upgraded to have a rifle scope. Operation S584 is performed by the processing device 440 to depict the accessory kit AC1 in the virtual reality content VRS2 with the appearance model MD1 and the appearance add-on model MAD1 corresponding to the reward credit. In another example, when the user kills a certain amount of monsters in the gaming application, the blade owned by the user is upgraded to have an aura effect. Operation S584 is performed by the processing device 440 to depict the accessory kit AC2 in the virtual reality content VRS2 with the appearance model MD2 and the appearance add-on model MAD2 corresponding to the reward credit.

It is noticed that the network server 460 in this embodiment is wirelessly communicated with the VR system 400 over a network connection, but the disclosure is not limited thereto. In another embodiment, the network server 460 in FIG. 6 can be replaced by a local database established in the storage medium 443 of the VR system 400. Data of the reward credit and the appearance add-on model can be stored in the local database.

As shown in FIG. 6 and FIG. 8, the processing device 440 in an embodiment is configured to transmit a three-dimensional diagram of the appearance add-on model MAD1 (the rifle scope) to the three-dimensional printer 480. The three-dimensional printer 480 is configured to produce an accessory add-on AD1 according to the appearance add-on model MAD1. The accessory add-on AD1 is attachable to the accessory kit AC1. The accessory add-on AD1 can be shipped to the user, such that the user can upgrade the accessory kit AC1 in the real world by attaching the accessory add-on AD1 onto the accessory kit AC1. The user can have a better experience while playing the gaming application.

Some embodiments of the disclosure includes a non-transitory computer readable storage medium with a computer program to execute the control method 200 in FIG. 2 and FIG. 3, the control method 300 in FIG. 4, or the control method 500 in FIG. 7.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A virtual reality system, compatible with an accessory kit, the virtual reality system comprising:
   a head-mounted display, configured for displaying a virtual reality content; and
   a processing device, coupled to the head-mounted display device and communicated with the accessory kit, the processing device being configured to:
   collect descriptor information from the accessory kit;
   obtain an accessory type identification of the accessory kit from the descriptor information, the accessory type identification being at least two of a button based input component type identification, and a sensor based input component type identification; and
   change input-output data processing of the accessory kit according to the accessory type identification, wherein the input-output data corresponds to interaction between at least one virtual reality object in the virtual reality content and the accessory kit, and wherein the input-output data processing change of the accessory kit according to the accessory type identification further comprises:
   the processing device periodically retrieves a sensor based data input when the accessory type identification includes the sensor based input component type identification, and the processing device retrieves a button based command input when a button based input component is triggered when the ATID includes the button based input component type identification.

2. The virtual reality system of claim 1, wherein the accessory type identification indicates that the accessory kit comprises the button-based input component, the input-output data comprises the command input sensed by the button-based input component, the processing device is configured to:
   process the command input from the accessory kit according to the accessory type identification when the button-based input component is triggered.

3. The virtual reality system of claim 2, wherein in response to the command input, the head-mounted display is configured for displaying a virtual effect or the at least one virtual reality object corresponding to the command input in the virtual reality system.

4. The virtual reality system of claim 1, wherein the accessory type identification indicates that the accessory kit comprises the sensor-based input component, the input-output data comprises a data input sensed by the sensor-based input component, the processing device is configured to:

process the data input from the accessory kit according to the accessory type identification periodically.

5. The virtual reality system of claim 4, wherein in response to the data input, the head-mounted display is configured for rendering the virtual reality content according to the data input.

6. The virtual reality system of claim 1, wherein the accessory type identification indicates that the accessory kit comprises a feedback output component, the input-output data comprises an output signal toward the feedback output component, the processing device is configured to:

encode the output signal toward the feedback output component according to the accessory type identification.

7. The virtual reality system of claim 6, wherein in response to the output signal, the feedback output component is configured for vibrating, broadcasting or illuminating corresponding to the virtual reality content.

8. The virtual reality system of claim 1, wherein the processing device being configured to:

select an appearance model according to the descriptor information; and depict the accessory kit in the virtual reality content with the appearance model.

9. The virtual reality system of claim 1, wherein the processing device is communicated with a network server or a local database, the processing device is configured to:

select an appearance model according to the descriptor information;

calculate a reward credit accumulated in a gaming application;

select an appearance add-on model from the network server or the local database according to the reward credit; and depict the accessory kit in the virtual reality content with the appearance model and the appearance add-on model.

10. The virtual reality system of claim 9, wherein the processing device is communicated with a three-dimensional printer, the processing device is configured to transmit a three-dimensional diagram of the appearance add-on model to the three-dimensional printer, the three-dimensional printer is configured to produce an accessory add-on according to the appearance add-on model, the accessory add-on is attachable to the accessory kit.

11. A control method, suitable for a virtual reality system comprising an accessory kit, the control method comprising:

collecting descriptor information from the accessory kit;

obtaining an accessory type identification of the accessory kit from the descriptor information, the accessory type identification being at least two of a button based input component type identification, and a sensor based input component type identification; and changing input-output data processing of the accessory kit according to the accessory type identification, wherein the input-output data corresponds to data transmission between the accessory kit and at least one virtual reality object provided by the virtual reality system, and wherein the input-output data processing change of the accessory kit according to the accessory type identification further comprises:

the processing device periodically retrieves a sensor based data input when the accessory type identification includes the sensor based input component type identification, and the processing device retrieves a button based command input when a button based input component is triggered when the accessory type identification includes the button based input component type identification.

12. The control method of claim 11, wherein the accessory type identification indicates that the accessory kit comprises the button-based input component, the input-output data comprises the command input sensed by the button-based input component, the control method comprises:

processing the command input from the accessory kit according to the accessory type identification when the button-based input component is triggered.

13. The control method of claim 12, wherein the control method further comprises:

in response to the command input, displaying a virtual effect or the at least one virtual reality object corresponding to the command input in the virtual reality content.

14. The control method of claim 11, wherein the accessory type identification indicates that the accessory kit comprises the sensor-based input component, the input-output data comprises a data input sensed by the sensor-based input component, the control method comprises:

processing the data input from the accessory kit according to the accessory type identification periodically.

15. The control method of claim 14, wherein the control method further comprises:

in response to the data input, rendering the virtual reality content in a visual angle or an orientation according to the data input.

16. The control method of claim 11, wherein the accessory type identification indicates that the accessory kit comprises a feedback output component, the input-output data comprises an output signal toward the feedback output component, the control method comprises:

encoding the output signal toward the feedback output component according to the accessory type identification.

17. The control method of claim 16, wherein the control method further comprises:

in response to the output signal, triggering the feedback output component to activate corresponding to the virtual reality content.

18. The control method of claim 11, wherein the control method further comprises:

selecting an appearance model according to the descriptor information; and depicting the accessory kit in the virtual reality content with the appearance model.

19. The control method of claim 11, wherein the control method further comprises:

selecting an appearance model according to the descriptor information;

calculating a reward credit accumulated in a gaming application;

selecting an appearance add-on model according to the reward credit; and depicting the accessory kit in the virtual reality content with the appearance model and the appearance add-on model.

20. A non-transitory computer readable storage medium with a computer program to execute a control method, wherein the control method comprises:
- collecting descriptor information from an accessory kit;
- obtaining an accessory type identification of the accessory kit from the descriptor information, the accessory type identification being at least two of a button based input component type identification, and a sensor based input component type identification; and
- changing input-output data processing of the accessory kit according to the accessory type identification, wherein the input-output data corresponds to interaction between the accessory kit and at least one virtual reality object provided by a virtual reality system, and wherein the input-output data processing change of the accessory kit according to the accessory type identification further comprises:
- the processing device periodically retrieves a sensor based data input when the accessory type identification includes the sensor based input component type identification, and
- the processing device retrieves a button based command input when a button based input component is triggered when the accessory type identification includes the button based input component type identification.

* * * * *